March 8, 1949.　　　　B. SPEICHER　　　　2,463,570
DRYING MACHINE FOR COATED ARTICLES
Filed June 14, 1945　　　　　　　　　　5 Sheets-Sheet 1

INVENTOR.
Bert Speicher,
BY Victor J. Evans & Co.
ATTORNEYS

March 8, 1949.  B. SPEICHER  2,463,570
DRYING MACHINE FOR COATED ARTICLES
Filed June 14, 1945  5 Sheets-Sheet 3
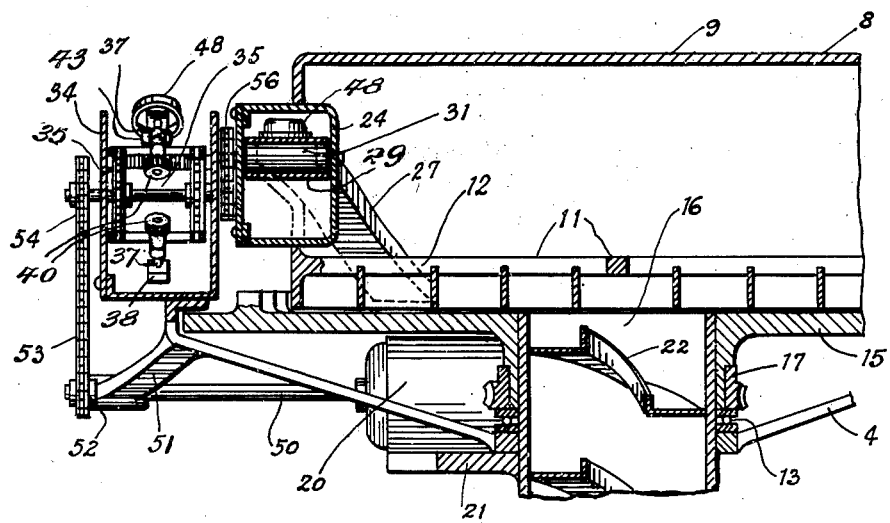
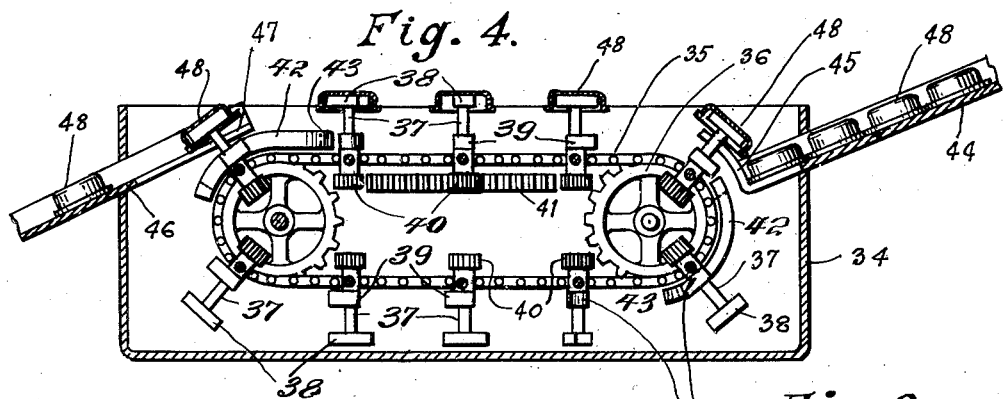
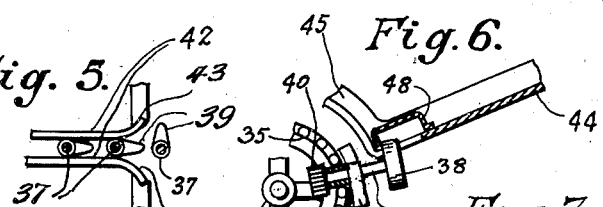
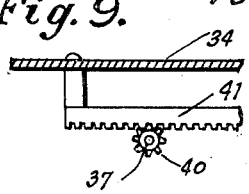
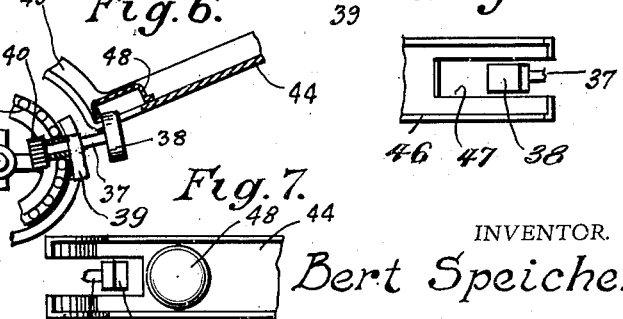
INVENTOR.
Bert Speicher,
BY Victor J. Evans & Co.
ATTORNEYS March 8, 1949.                B. SPEICHER                2,463,570
                    DRYING MACHINE FOR COATED ARTICLES
Filed June 14, 1945                              5 Sheets-Sheet 4
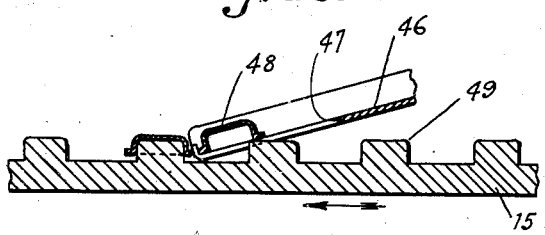
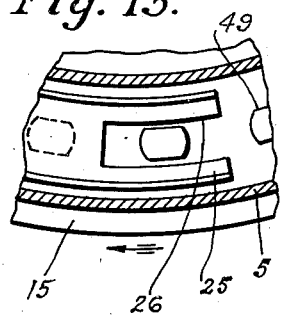
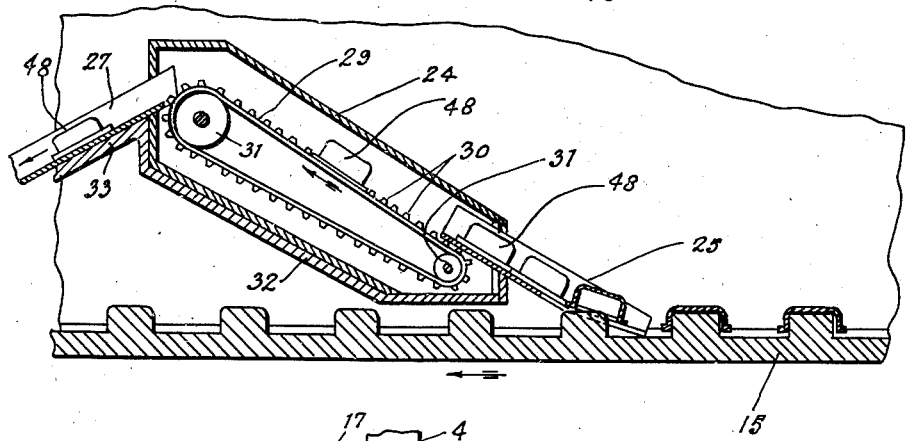
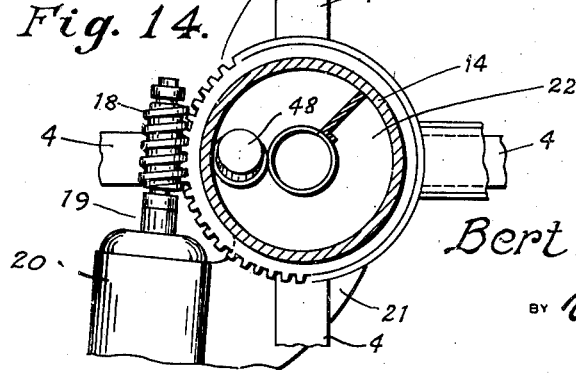
INVENTOR.
Bert Speicher,
BY Victor J. Evans & Co.
ATTORNEYS March 8, 1949.  B. SPEICHER  2,463,570
DRYING MACHINE FOR COATED ARTICLES
Filed June 14, 1945  5 Sheets-Sheet 5
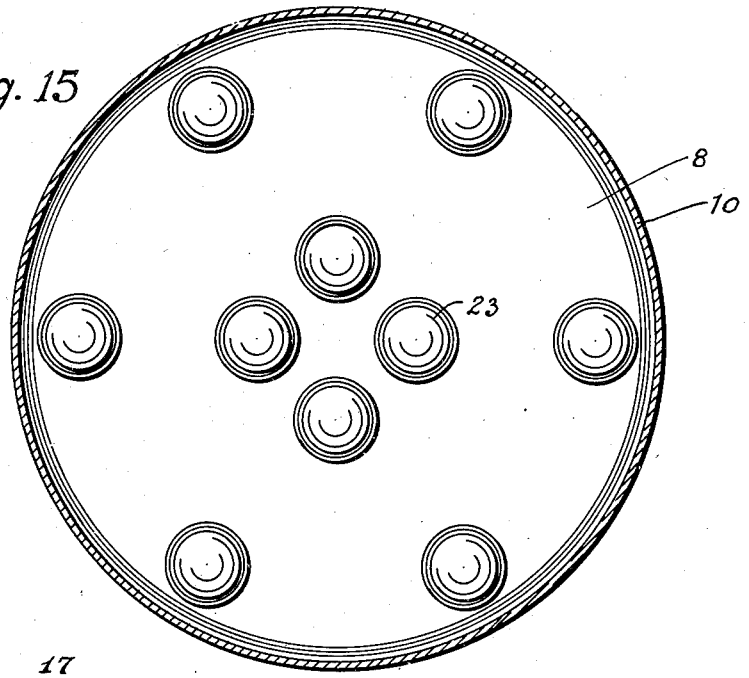
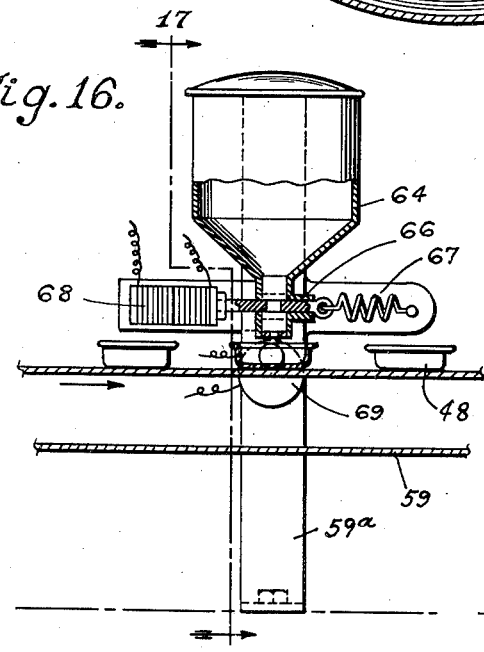
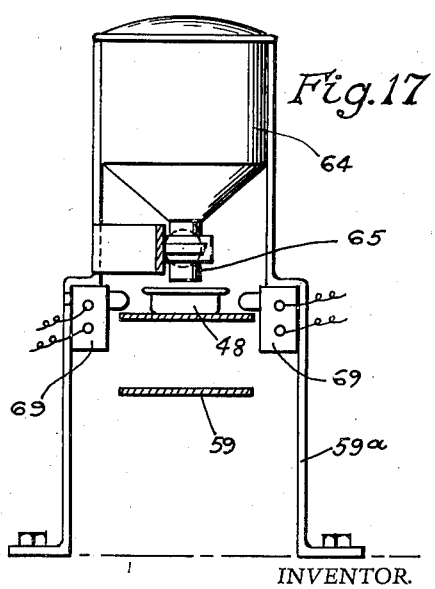
INVENTOR.
Bert Speicher,
BY Victor J. Evans & Co.
ATTORNEYS Patented Mar. 8, 1949

2,463,570

UNITED STATES PATENT OFFICE 2,463,570

DRYING MACHINE FOR COATED ARTICLES

Bert Speicher, Newark, N. J.

Application June 14, 1945, Serial No. 599,384

3 Claims. (Cl. 34—68)

1

My present invention, in its broad aspect, has reference to improvements in cap processing machines, having unique means whereby such caps may be handily and quickly sprayed with a coating such as enamel, paint or the like, and turned while sprayed, and then dried, and then baked for a pre-determined length of time, and afterwards paraffined, all as an automatic and controlled operation.

In its specific embodiment, my invention includes a hollow pedestal within which is a spiral chute for the coated caps, which pedestal carries a fixed drying compartment, a fixed baking compartment, and a fixed spiral guide. This pedestal supports a rotatable disc having one or more rows of stools upon which are deposited the caps after they have been sprayed and are carried on the stools through the drying compartments and then removed and deposited on an area of the disc beneath the spiral guide and infra-red ray baking compartment, and as the disc revolves, the caps are moved by the spiral guide to a central opening leading to the spiral chute in the pedestal. A cap turning device of unique construction receives the caps from the spiral chute and delivers them to a conveyor which passes beneath a solenoid valve controlled paraffin container. An electric eye controls the solenoid valve to deliver the proper quantity of paraffin to the respective caps. All of the specific elements of my device, as briefly outlined above, are improved and unique and so arranged as to simplify and reduce both time and labor in attaining the results desired, and my device is sturdy, practical, efficient, and has no fragile or intricate parts likely to get out of order or to become deranged or inapt for use, or broken.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claims.

In the drawings, wherein I have illustrated a preferred form of my invention:

Figure 3 is a section on the line 3—3 of Figure 2;

Figure 4 is a section on the line 4—4 of Figure 2;

Figure 5 is a detail of the guide for the cap sup-

Figure 1:
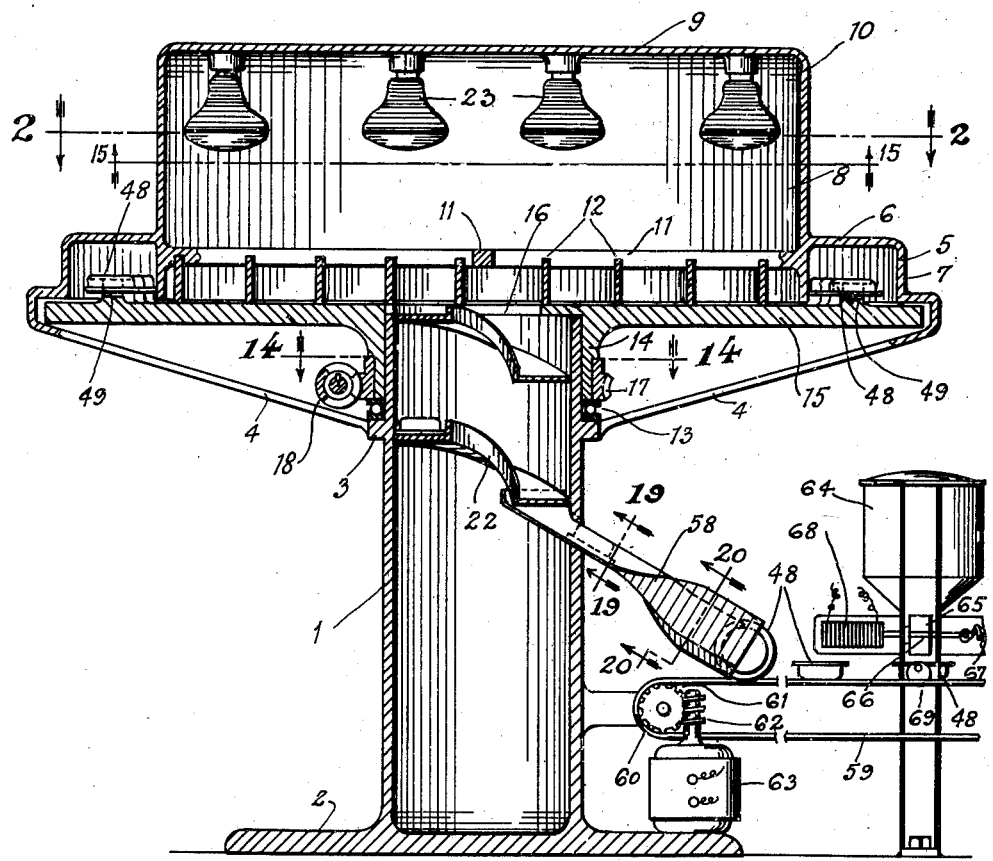
Figure 1 is a vertical section through my device.
Figure 2:
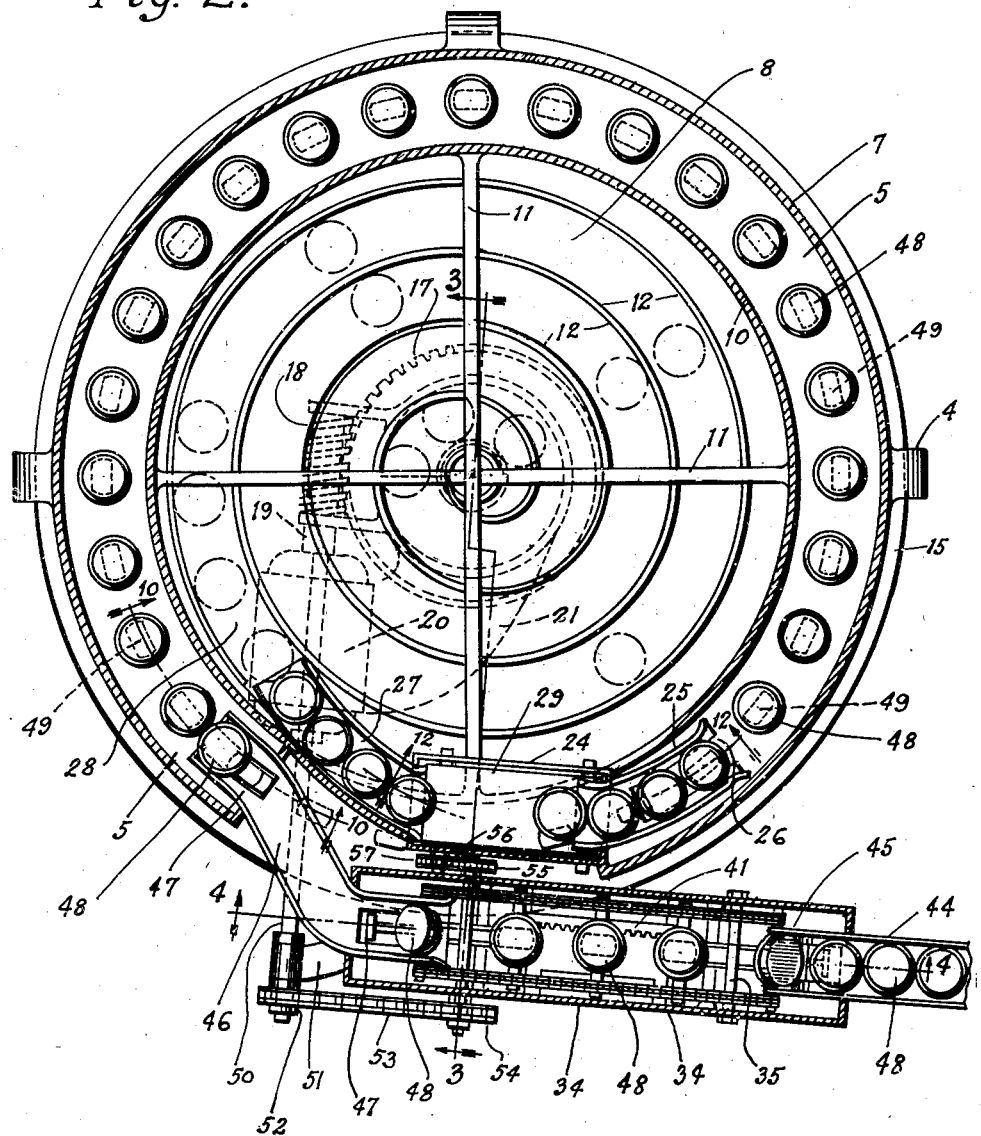
Figure 2 is a transverse section on the line 2—2 of Figure 1.

2 porting pins on the conveyor of the spray for delivery of the caps to the chute transferring them to the disc;

Figure 6 is a detail showing the pins picking up the caps from the delivery conveyor on which they may be placed by hand;

Figure 7 is a detail of the delivery chute;

Figure 8 is a detail of the slotted chute for receiving the caps from the cap supporting pins of the spray conveyor;

Figure 9 is a detail of the rack and cog for turning the cap supporting pins of the sprayer conveyor;

Figure 10 is a section through the disc showing the stools picking up the caps;

Figure 11 is a detail showing the chute delivering the caps to the stools;

Figure 12 is a section on the line 12—12 of Figure 2;

Figure 13 is a detail of the chute in its relation to the stools on the disc;

Figure 14 is a section on the line 14—14 of Figure 1;

Figure 15 is a transverse section on the line 15—15 of Figure 1;

Figure 16 is a vertical section of the conveyor, solenoid valve, electric eye, and paraffin container;

Figure 17 is a section on the line 17—17 of Figure 16;

Figure 18 is a detail of the solenoid switch;

Figure 19 is a section on the line 19—19 of Figure 1; and

Figure 20 is a section on the line 20—20 of Figure 1.

In the drawings, wherein like characters of reference are used to designate like or similar parts:

The numeral 1 designates a hollow, vertical pedestal having a base 2. Near the top of the pedestal is fixed an annular ring 3 having upwardly and angularly extending supporting arms 4 to which is fixed a circular housing member providing a drying tunnel 5 having a top and side walls 6 and 7 respectively and an open bottom. Fixed to the housing member 5 is a circular hollow housing member 8 having a top and side walls 9 and 10 providing a baking oven. Attached to the interior wall of the housing member 8 are crossed bars 11 supporting a spiral guide member or vane 12. All of the above parts are fixedly mounted on the pedestal. Mounted on the ring 3 is one element of the ball race of a ball bearing assembly 13 on which is seated for rotation on the pedestal the sleeve-like depending support 14 of a revolving disk 15 which is directly beneath housings 5 and 8 and spiral guide 12. The disk has a central opening 16 directly over and communicating with the interior of the pedestal, and the supporting sleeve 14 has a gear 17 meshing with a worm 18 carried by the drive shaft 19 of a motor 20 supported on the curved bracket arm 21 on the pedestal—see Figures 2 and 3. Within the hollow pedestal is a spiral chute 22 leading from the opening 16 in the disk. Mounted in the housing 8 are a plurality of infra-red baking lamps 23—see Figures 1 and 15.

Formed at a slight angle in one side of the baking chamber or housing 8 — see Figure 2 — is an inclined compartment 24 having a curved downwardly extending slide 25 at one end with a slot 26 at its lower end extending from that end into the housing 5 and contacting the top of the disk. Extending from the opposite end of the compartment 24 is another curved downwardly extending slide 27 which extends into the baking chamber or housing 8 and leads to the mouth 28 of the spiral guide 12. Between the slides 25 and 27 is an endless conveyor belt 29 — see Figure 12 — which may have surface irregularities 30 and which is mounted on rollers 31. The compartment double supporting bottom 32 has an extension 33 which supports the slide 27 at its top end. Supported by the arms 4 and associated parts is a trough-like part 34 which is disposed beside and somewhat lower than the compartment 24 — see Figure 3 — in which is carried an endless conveyor 35 of the chain type mounted on sprockets 36 and carrying spaced outstanding pins 37 with heads 38 which pins are journalled for rotatable movement in sleeves 39 on the belt 35. Each pin has a cog or gear 40 which during the movement of the conveyor meshes with a short rack bar 41 to be rotated thereby. At each end of the conveyor are guides 42 with flared ends 43 between which the pins pass — see Figures 5 and 6. An inclined chute 44 feeds into the end of the trough 34 and to the conveyor belt, and has an upwardly and forwardly curved slotted extension 45. At the opposite end of the trough is a downwardly sloping curved slide 46 which leads from the conveyor 35, and the upper and lower ends of which are slotted as at 47 to receive therebetween the pins and heads. Suitable coating or spraying means (not shown) are designed to be associated with the trough. Caps 48 may be fed into the inclined chute 44 by hand or the like, whence they slide down to the extension 45 — see Figure 4 — where they are picked up on a head 38 of a pin 37 and carried by the conveyor belt 35 for coating and spraying with enamel, paint or the like. As they reach the opposite end of the trough 34, they are picked off of the heads 38 by slotted end 47 of chute 46 and travel down the chute — see Figure 2 — to enter the drying chamber 5 and be deposited one on each stool or support 49 on a circular row of spaced stools on the revolving disk 15 whence they travel through the drying chamber 5. When they reach the slotted end 26 of slide 25, the caps are picked off of the stools 49 and travel up the same — see Figure 12 — to conveyor belt 29 where they are deposited in chute 27 at the opposite end of the compartment 24 and slide to the disk 15 at the mouth 28 of the spiral guide 12. Rotation of the disk carries them about a spiral path to the center opening 16 where they fall to the spiral trough 22 within the pedestal. While following the spiral path, the caps 49 are subjected to the heat of the infra-red lamps 23 in the baking chamber 8 so that the structure described hereinbefore completes in a simple, practical manner the coating of the caps 49 with enamel, paint or the like, and the drying and baking of the same, and transference of the caps to spiral trough 22 on the pedestal. To drive the conveyors 29 and 35, my motor 20 has an extension drive shaft 50 supported by the bracket arm 51 and having a sprocket 52 over which a chain 53 travels from a cog 54 on the shaft of one of the sprockets of conveyor 35 — see Figures 2 and 3, at the opposite end of which is a cog 55 and chain 56 to a sprocket 57 on one of the rollers 31 of conveyor 29 in compartment 24.

Associated with the lower end of the spiral trough 22 is a turning trough 58 — see Figure 1, 19 and 20 — which leads out of the pedestal and to a conveyor 59 on rollers 60, one of which has a gear 61 meshing with a worm 62 on the motor 63 mounted on the base 2 of the pedestal. The cap 48 is turned upside down by the turning trough 58 and deposited on the conveyor 59. Over the conveyor 59 is supported as at 59a a paraffin receptacle 64 having a dispensing nozzle 65 provided with a valve slide 66. The slide valve 66 is connected with a spring 67 to normally be maintained in closed position, as shown in Figure 18. A solenoid 68 is connected to the opposite end of the slide. Electric eyes 69 are in circuit with the solenoid and are directed toward the path of caps on the conveyor, so that as each cap 48 passes between the eyes, the solenoid is energized to open the slide valve 66 to deposit paraffin in the cap after the manner shown in Figures 16, 17 and 18. This completes the paraffining operation.

From the foregoing, it is believed that the operation and advantages of my invention will be apparent, but it is again emphasized that interpretation of the scope of my invention should only be conclusive when made in the light of the subjoined claims.

I claim:

1. In a machine for coating bottle caps and the like, the combination, which comprises, a stand having a tubular pedestal extending upward therefrom, a disk having a plurality of spaced cap supports spaced inward from the periphery thereof rotatably mounted on the upper end of the pedestal, means rotating the disk, a housing positioned above the disk having a flange extending around the outer edge of the disk and provided with supporting arms through which the housing is supported from the pedestal, said housing having an outer annular drying tunnel enclosing the supports, a centrally disposed baking oven enclosing the intermediate part of the disk, heating means in said oven, a spiral vane substantially engaging the upper surface of the disk for guiding caps from the air tunnel to the tubular pedestal, a chain conveyor having individual cap holding heads positioned at one side of the disk, means supplying caps to the heads of the chain conveyor, a chute having a forked end for removing caps from the heads of the chain conveyor, said chute positioned to deliver the said caps to the supports of the disk, feeding means removing the caps from the supports in the tunnel and depositing the caps on the disk in the entrance to the spiral vane in the oven, conveying chutes in the pedestal positioned to receive caps from the oven, and a horizontally disposed conveyor positioned to receive caps from the chutes in the pedestal.

2. In a drying machine for bottle caps and the like, the combination, which comprises a tubular pedestal, a disk having a plurality of spaced supports on the upper surface and adjacent the periphery thereof, means rotatably mounting the disk on the upper end of the pedestal, means rotating the disk, a stationary housing positioned above the disk having an outer annular drying tunnel enclosing the supports and a centrally disposed baking oven enclosing the intermediate part of the disk, heating means in said oven, a stationary spiral vane within said oven adapted to guide objects from the drying tunnel into and through the oven and to the tubular pedestal, means feeding caps to the supports in the tunnel, means feeding caps from the spaced supports of the tunnel to the spiral vane of the oven, and means receiving the objects from the spiral vane and directing them out of the pedestal.

3. In a drying machine for bottle caps and the like, a horizontally disposed disk having a plurality of spaced supports extended upwardly from the upper surface concentric with the center and spaced from the periphery thereof, said disk having a discharge opening in the center, means rotatably mounting the disk, means rotating the disk, a stationary housing positioned above the disk having a centrally disposed baking oven covering the intermediate portion of the disk and an enclosed drying tunnel covering the supports around the periphery of the disk, heating means in said oven, a stationary spiral vane positioned to receive the caps from the tunnel and adapted to guide the caps over the surface of the disk to the discharge opening at the center, means feeding caps to the supports in the tunnel, and means feeding caps from the spaced supports of the tunnel to the spiral vane of the oven.

BERT SPEICHER.

REFERENCES CITED

The following references are of record in the file of this patent:

UNITED STATES PATENTS

| Number | Name | Date |
|---|---|---|
| 557,029 | Schaake | Mar. 24, 1896 |
| 1,185,329 | Janish | May 20, 1916 |
| 1,869,630 | Stone | Aug. 2, 1932 |